May 19, 1942.   J. T. MARSHALL   2,283,682
DASH POT
Filed Aug. 26, 1941

Inventor
John T. Marshall.
By David F. Woody.
Attorney

Patented May 19, 1942

2,283,682

UNITED STATES PATENT OFFICE 2,283,682

DASH POT

John T. Marshall, South Bend, Ind., assignor to Bendix Aviation Corporation, South Bend, Ind., a corporation of Delaware Application August 26, 1941, Serial No. 408,373

3 Claims. (Cl. 188—97)

This invention relates to rate controlling mechanisms and more particularly to a dash pot for use with a throttle valve, relay, or similar element to be controlled in time.

It is an object of the present invention to provide a dash pot wherein loss of fluid is effectively prevented.

It is an additional object of the present invention to provide a dash pot wherein the rate of movement of the time controlling element may be adjusted, and wherein, by means of a flexible seal and self-contained unit, escape of fluid beyond the confines of the dash pot is prevented.

Other objects will appear from a study of the following specification when made in conjunction with the attached drawing, throughout which like numerals designate like parts.

In the Marshall application, Serial No. 380,564, filed on February 25, 1941, there is disclosed and claimed a novel dash pot for the control of a relay, a motor starting switch, a throttle, or the like. The dash pot disclosed and claimed in the prior application is effective for use in a field identical with that of the present disclosure, but a close lap fit between the cylinder and piston shown in that application is a requisite to high performance, and also, to the successful confining of fluid within the dash pot. By use of a dash pot of the present invention, the necessity of a lap fit between a piston and a cylinder is avoided, and at the same time, the oil or other fluid utilized in the operation of the dash pot is confined within the housing of the dash pot by means of a fluid-tight seal. The resultant structure is one that may be more cheaply and quickly made without the sacrifice of high qualities of operation obtained by the prior structure of applicant.

Figure 1:
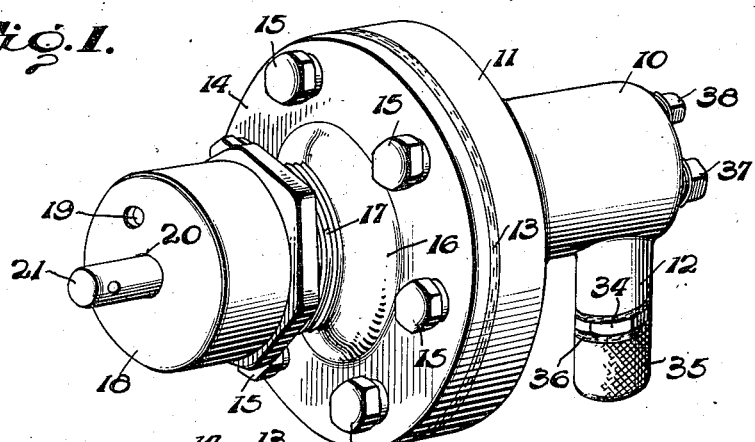
Fig. 1 is a perspective view of a dash pot made in accordance with the present invention.
Figure 2:
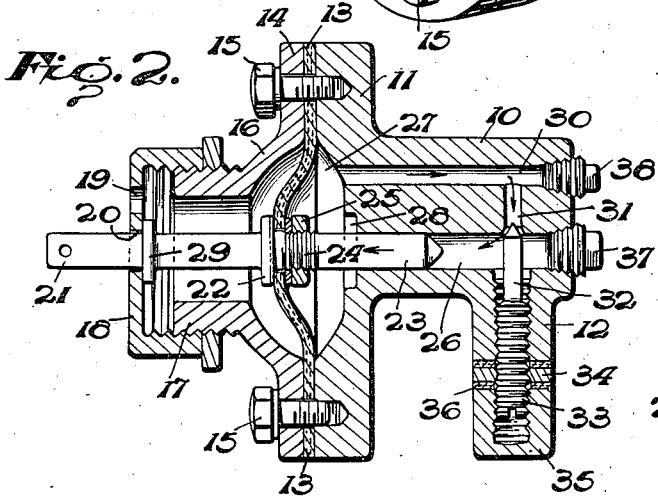
Fig. 2 is a longitudinal sectional view of the dash pot shown in Fig. 1.
Figure 3:
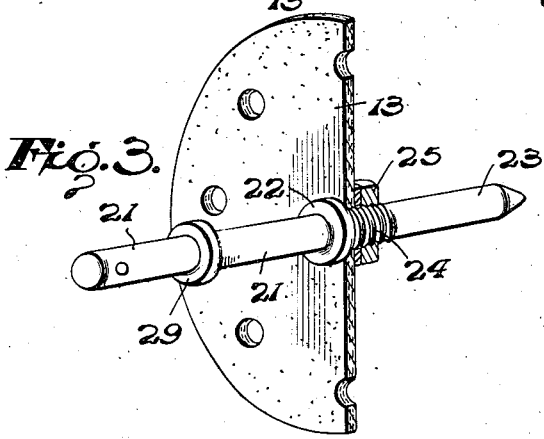
Fig. 3 is a detailed view in perspective of a sub-assembly of the dash pot shown in Fig. 2.
Figure 4:
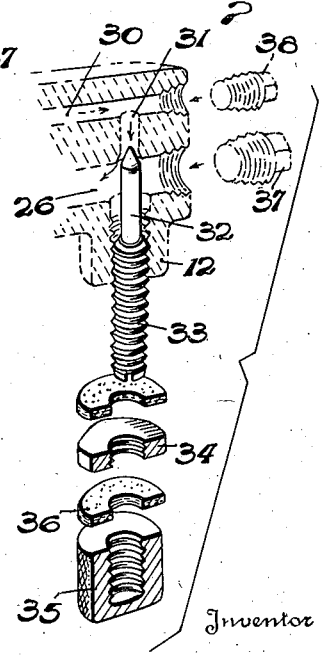
Fig. 4 is another detail in perspective and partly in section, of the construction shown in Fig. 2.

Having reference to the drawing, principally Figs. 1 and 2, there is shown at 10 a machined or cast metallic housing having a transverse circular flange member 11, and a depending cylindrical portion 12. A flexible membrane or diaphragm member 13 of leather, rubber or a substitute such as "Neoprene," extends across the open end of housing 10 and has its outer edge held in a fluid-tight seal with flange 11 by means of an abutting flange 14, which is held tightly against diaphragm 13 by means of a plurality of stud screws 15. Flange 14 has a central dome-like portion 16 terminating in a screw-threaded neck 17, which is capped by a screw closure 18, having a port 19 for the entrance of atmospheric air within the dome 16. Closure 18 also has a central bore 20, through which projects a rod-like arm member 21, which extends within dome 16, terminating in a flange portion 22, and being connected to a piston member 23. The end of piston member 23 is screw-threaded as at 24 to receive a nut 25 for connecting diaphragm member 13 to piston 23, in a fluid-tight seal.

Piston 23 is movable within a cylinder 26 formed longitudinally in housing 10, and the left-hand portion of cylinder 26 terminates in an enlarged chamber or recess 27, which is meant for holding a fluid, such as oil or the like. The motion of piston 23 to the right is limited by an abutment 28 formed at the end of cylinder 26, and motion of piston 23 to the left is limited by a cylindrical shoulder 29, which abuts against the top of screw closure 18.

A longitudinally extending bore 30 affords communication between chamber 27 and cylinder 26 through an orifice 31, extending transversely of cylinder 26. A transversely extending metering pin 32 has a conical end projecting into orifice 31, and the amount of this projection may be regulated by adjustment of the screw-threaded shank 33 within cylindrical portion 12 of the housing 10. Any selected adjustment of shank 33, or of pin 32, is maintained by means of a lock-nut 34, and the escape of oil from cylindrical portion 12 is prevented by means of a screw-cap 35, which may be sealed tightly against lock-nut 34 by means of a suitable gasket 36.

Since cylinder 26 and bore 30 may be formed within housing 10 by a simple drilling operation, screw stoppers 37 and 38, respectively, may be employed to seal the open ends of these members.

While the fit between cylinder 26 and piston 23 may be as close as desired, it need not be a lap fit, nor any closer than that usual in ordinary shop practices. When the dash pot is to be operated, the element to be time-controlled is connected to arm 21, and as indicated by the arrows in Fig. 2, motion of arm 21 to the left tends to withdraw piston 23 from cylinder 26, and oil is drawn through orifice 31 from chamber 27 by means of bore 30, and the rate at which the oil flows through orifice 31 depends upon the opening afforded by pin 32. Movement of piston 23 to the left causes the central portion of diaphragm 13 to be flexed toward the right, due to the low pressure in chamber 27 caused by the flow of oil into cylinder 26, as indicated by the arrows.

Upon motion of piston 23 to the right, the central portion of diaphragm 13 will be flexed to the left toward dome portion 16, due to the increased pressure within chamber 27 due to the reversal of fluid flow from cylinder 26 back through orifice 31 and bore 30.

In motion to the right, as well as motion to the left, the rate of movement of arm 21 is regulated by the effective opening available in orifice 31, and thus, the dash pot of the present invention regulates the rate of movement of the element connected to arm 21 for movement in two directions.

Since the oil within the dash pot is used in a closed cycle, there can be no leakage exteriorly of housing 10, and further, if the tolerance of the fit between cylinder 26 and piston 23 is high, the leakage or flow of oil past piston 23 may be compensated for by the adjustment given to pin 32. Therefore, expensive machining and grinding operations, in order to fit piston 23 within cylinder 26 with close tolerances, are avoided, without, however, leakage or loss of control within the dash pot.

While only one embodiment of the present invention has been shown in the drawing, it is to be understood that various changes may be made without departing from the scope of the present invention. For this reason, it is intended not to limit the invention by the descripion herein given as an example, but solely by the scope of the appended claims.

What is claimed is:

1. A dash pot comprising a housing having a longitudinal cylinder, a piston therein, a rod-like extension connected to said piston, a transversely extending diaphragm of flexible material being tightly connected to said piston, means for sealing the edge of said diaphragm to said housing, a fluid chamber about said piston at one end thereof, said diaphragm forming a flexible wall thereof, a longitudinally extending bore having one end opening into said chamber and its other end opening into a transversely extending orifice in communication with said cylinder, a transversely extending metering pin extending into said orifice, and means on said rod-like extension for connecting said piston and extension to an element to be time-controlled, whereby, upon motion of said extension to withdraw said piston from said cylinder, the rate of withdrawal of said piston is governed by the rate at which fluid is drawn through said orifice into said cylinder.

2. A dash pot for regulating the rate of movement of a time-controlled element, comprising an arm for connection to said element, a housing, a cylinder formed therein, a piston slidably carried by said cylinder, said piston being connected to said arm, a fluid chamber at one end of said cylinder, a flexible diaphragm having a fluid-tight, central connection to said piston, means for holding the outer edge of said diaphragm in sealing engagement with said housing, whereby said diaphragm forms a flexible wall of said chamber, an orifice at one end of said cylinder, a bore connecting said orifice with said fluid chamber and a metering pin adjustably related to said orifice, whereby the rate of movement of said arm is dependent upon the rate of flow from said chamber through said orifice.

3. A dash pot for controlling the rate of movement of an element, an arm for connection to said element, a piston connected to said arm, a housing, a cylinder contained therein for receiving said piston, a flexible membrane connected at its central portion to said piston and having its outer edge sealed to said housing, a recess formed at one end of said cylinder, forming, with said diaphragm, a fluid chamber, an orifice opening into said cylinder at the other end thereof, an adjustable metering pin projecting transversely of said cylinder into said orifice, and a bore connecting said chamber, said orifice and said cylinder, whereby, upon motion of said arm, the rate will be determined by the rate of flow of fluid through said orifice.

JOHN T. MARSHALL.